United States Patent Office 3,463,827
Patented Aug. 26, 1969

3,463,827
NOVEL METAL CARBONYL CATALYSTS
AND THEIR USE
Robert L. Banks, Bartlesville, Okla., assignor to Phillips
Petroleum Company, a corporation of Delaware
No Drawing. Filed Mar. 13, 1961, Ser. No. 94,996
Int. Cl. C07c 3/62, 11/00
U.S. Cl. 260—666                    25 Claims This invention relates to the catalytic conversion of acyclic unsaturated hydrocarbons primarily to higher molecular weight products. In accordance with one aspect, this invention relates to novel Group VI–A metal carbonyl catalysts. In accordance with another aspect, this invention relates to the preparation of supported Group VI–A metal carbonyl catalysts. In a further aspect, this invention relates to the catalytic conversion of unsaturated hydrocarbons, especially alkenes and alkynes, primarily to higher molecular weight products such as liquid and solid polymers, aromatic hydrocarbons, cycloparafinic hydrocarbons and the like.

In the field of hydrocarbon conversion, numerous catalysts have been disclosed for converting paraffins and/or olefins to different hydrocarbon products. Many of these catalysts are solid, and the reactions employing these catalysts are of the heterogeneous type. For example, various metals, metal oxides, and metal chlorides have been supported on such materials as silica, alumina and the like. While, in some reactions, the support has little, if any effect on the reaction in which the catalyst is being used, many supports show strong activity themselves for catalyzing the reaction. The present invention relates to novel supported Group VI–A metal carbonyl catalysts effective for the conversion of acyclic unsaturated hydrocarbons, such as alkenes and alkynes, into a variety of useful products.

Accordingly, an object of this invention is to provide novel supported Group VI–A metal carbonyl catalysts.

Another object of this invention is to provide novel supported Group VI–A metal carbonyl catalysts active for effecting such reactions as polymerization, disproportionation, cyclization, and the like.

A further object of this invention is to provide methods for preparing supported Group VI–A metal carbonyl catalysts.

A further object is to provide a catalytic process for the preparation of cycloparaffins such as cyclopropane, methylcyclopropane, and the like from ethylene.

Another object is to provide an improved process for the disproportionation of 1- and 2-olefins having from 3–16 carbon atoms to higher and lower molecular weight olefinic products.

A still further object is to provide an improved catalytic process for converting ethylene to butenes, especially 1-butene.

A still further object is to provide an improved catalytic process for polymerizing alkynes having 2–4 carbon atoms to liquid aromatic hydrocarbons.

A further object is to provide a process for the preparation of solid polymers from 1-olefins, especially ethylene.

Other objects of the invention will become apparent from a consideration of this disclosure and the appended claims.

Broadly, according to the invention, acylic mono-unsaturated hydrocarbons, particularly 1- and 2-alkenes and alkynes, are catalytically converted principally to higher molecular weight products by contacting at least one of same under conversion conditions of temperature and pressure with a supported Group VI–A metal carbonyl catalyst.

The novel catalysts which are provided according to the invention comprise a Group VI–A metal carbonyl associated with at least one oxide selected from the group consisting of silica, alumina, and silica-alumina. The metal carbonyls that can be incorporated into or associated with oxide supports are the Group VI–A (left-hand subgroup of the Mendeleef Periodic Table of Elements) metal carbonyls and include molybdenum hexacarbonyl, tungsten hexacarbonyl, and chromium hexacarbonyl.

The catalyst according to this invention can be prepared by direct mixing of solid components, impregnation, etc. In order to obtain optimum activity, it is preferred that the support material or inorganic oxide be heated under elevated temperature and for a time sufficient to activate same before incorporation with the Group VI–A metal carbonyl.

The support materials employed are preferably the high surface area silicas, aluminas, and silica-aluminas, which are well known and can be readily synthesized or obtained commercially. For example, silica gel can be readily obtained by precipitation from water glass solutions by addition of an acid, such as phosphoric acid. Alumina, on the other hand, can be precipitated from solutions of an aluminum salt. The terms "support" or "base" as used herein, are not to be narrowly interpreted. They are not limited to mere inert components of the catalyst mass. In fact, the non-carbonyl components appear to impart to the catalyst at least part of its activity, and variations in their identity and proportions affect the catalyst activity. The "support" is preferably utilized in the porous form, for example, a gel.

According to the invention, the support is first activated by heating with air and/or an inert gas such as nitrogen, at a temperature above about 500°, preferably at a temperature from about 750 to about 1500° F. Activation of the support can be carried out in any desired manner. However, I prefer to heat the support with air at elevated temperature or in an atmosphere of any other suitable gas such as hydrogen, helium, nitrogen, etc. The length of time the support will be held at the activation temperature will depend upon the temperature employed but, in general, the support is heated for at least 5 minutes. The support should be heated at a sufficiently elevated temperature for a period long enough to remove substantially all of the free water present in the support.

After activation of the support, the metal carbonyls are then incorporated by either an impregnation method or by dry mixing with the activated support. In any event, whatever the method of application of the metal carbonyl, the support will be treated in a manner so as to apply from 0.01 to about 20 weight percent of the metal carbonyl based on the support. A more preferred range is from 0.1 to 10 weight percent of the metal carbonyl on the same basis.

When the activated support is impregnated with the desired metal carbonyl, the metal carbonyl is preferably applied as a hydrocarbon solution. Representative hydrocarbon solvents that can be employed for the metal carbonyls of the invention are the aromatic hydrocarbons such as benzene and toluene, cycloparaffins such as cyclohexane and methylclohexane, and normal paraffinic and isoparaffinic hydrocarbons containing from 4 to 10 carbon atoms per molecule or mixtures of these hydrocarbons. Suitable paraffins include n-butane, n-pentane, n-hexane, isooctane and n-decane. The concentration of metal carbonyl in hydrocarbon solution will generally range from about 1 to about 10 weight percent. The solubility of the metal carbonyls is ordinarily quite low at room temperature and, therefore, it is frequently desirable to heat the hydrocarbon solvent to a temperature of about 150 to about 160° F. to dissolve the metal carbonyl. Usually, it will be necessary to maintain sufficient pressure to maintain the solution substantially completely in liquid phase.

The hydrocarbon solution of the metal carbonyl is then contacted with the activated support in an amount sufficient to apply the desired amount of metal carbonyl to the support. One suitable method that can be employed is to apply just enough solution to completely wet the activated support. The hydrocarbon solvent is then removed from the catalyst, for example, by flushing with an inert gas at a temperature below about 300° F., following which the carbonyl-containing support is maintained at a temperature from about 50 to about 700° F. under vacuum, which can range from about 1 mm. to about 100 mm. mercury absolute pressure. This heat treatment generally can be carried out for a time ranging from about 10 minutes to about 10 hours, preferably from about 0.5 to about 5 hours, utilizing longer times at lower temperatures and vice versa. When employing dry mixing of the metal carbonyl with the activated support, a heat treatment under vacuum within the above ranges can also be used, if desired.

The novel supported Group VI–A metal carbonyl catalysts of this invention, prepared as described above, are useful for a variety of reactions for the conversion of unsaturated hydrocarbons including the disproportionation of 1- and 2-olefins, the polymerization of alkynes, the polymerization of 1-olefins, especially ethylene, to solid polymers, the conversion of ethylene to cyclopropane, dimerization of ethylene to higher olefins, especially 1-butene, and the like.

Acyclic mono-unsaturated hydrocarbons that can be converted primarily to higher molecular weight products according to the invention include 1- and 2-alkenes containing from 2 to 16 carbon atoms per molecule and alkynes having from 2 to 44 carbon atoms per molecule.

Representative examples of olefinic (alkene) hydrocarbons that can be converted primarily to higher molecular weight products according to the invention, for example, liquid and/or solid polymers, cyclics, olefinic products, and the like, include ethylene, propylene, 1-butene, 1-pentene, 2-pentene, 1-hexene, 2-heptene, 1-octene, 2-nonene, 1-dodecene, 2-tetradecene, 1-hexadecene, and the like. Representative alkynes that can be converted to aromatic hydrocarbons, for example, according to the invention include acetylene, propyne, butyne, and the like.

The reaction conditions employed, e.g. temperature, pressure, flow rates, etc., for the various reactions contemplated will vary appreciably depending upon the particular catalyst component employed, the particular product desired, and other process variables. However, in general the temperature employed will ordinarily range from about 0° F. to about 600° F., preferably from about 100° F. to about 500° F. The pressure to be used normally ranges from about 0 to about 3000 p.s.i.g. or higher, preferably from about 100 to about 1000 p.s.i.g.

In a liquid-phase process wherein a fixed bed of catalyst is used, the space velocity in volumes of liquid per volume of catalyst per hour will ordinarily range from about 0.5 to about 20, preferably from about 1 to about 6 liquid hourly space velocity. Similarly, space velocities in volumes of gas per volume of catalyst per hour will range from about 50 to about 10,000 for gaseous or vapor phase operations. The reaction time will generally range from about 0.1 minute to about 10 hours or more, preferably from about 0.5 to 5 hours. In stirred reactor operations, for example, the catalyst concentration in the reaction zone will generally range from about 0.5 to about 40 weight percent of the reaction mixture.

The reactions defined above can be carried out either in the presence or absence of a diluent; however, generally it is preferred to employ a diluent that is not deleterious to the reaction, preferably a hydrocarbon diluent. Representative hydrocarbon solvents that can be employed include the aromatic hydrocarbons such as benzene and toluene, cycloparaffins and/or paraffins having up to 12 carbon atoms per molecule such as cyclohexane and methylcyclohexane, n-pentane, n-hexane, isooctane, dodecane, and the like, or mixtures thereof. When diluents are used, these can comprise from a minor amount up to about 95 percent by weight of the reaction mixture.

According to the invention, all of the conversion reactions can be carried out either batchwise or in a continuous manner, using either a fixed-catalyst-bed technique or a stirred reactor or mobile catalyst contacting techniques or any other well known contacting technique for the conversion of the various reactions into the desired products.

At the end of the reaction period, the hydrocarbon phase containing unreacted materials as well as the reaction products is separated from the catalyst by known methods and then subjected to product recovery, such as by fractionation, liquefaction, solvent extraction, and the like.

The reaction products (solid and liquid polymers, aromatics, higher olefins, and the like) produced in accordance with the invention have utility in industry in applications where similar materials are produced according to other methods. For example, solid polymers produced from 1-olefins according to the invention are characterized by their high density and are useful in the fabrication of plastic articles by such well known processes as injection molding, vacuum forming, extrusion molding, and the like. Aromatic hydrocarbons such as benzene, toluene, xylene, ethylbenzene, mesitylene, naphthalene, and the like can be formed by contacting the defined alkynes with the catalysts of the invention. All of these aromatic hydrocarbons have wide utility in chemical industries. Also, many of the higher molecular weight products that can be obtained according to the invention are useful as intermediates for the production of other valuable products. For example, ethylene can be converted to higher olefins, especially 1-butene, according to the invention, and the 1-butene thus obtained can be used for the manufacture of butadiene.

A more comprehensive understanding of the invention can be obtained by referring to the following illustrative examples which are not intended, however, to be unduly limitative of the invention.

Example I

A run was carried out in which ethylene was polymerized to solid polymer using a fixed bed of supported $Cr(CO)_6$ catalyst.

In this run, pelleted alumina was activated by heating in air and then nitrogen at 1000° F. One hundred thirty grams of the alumina was then impregnated with 56 cc. of dry cyclohexane containing 2.6 grams of $Cr(CO)_6$. The cyclohexane was then removed by flushing with $N_2$ for two hours at 280° F., after which the catalyst was maintained under vacuum (approximately one mm. Hg abs. pressure) for two hours at 280° F.

The supported $Cr(CO)_6$ catalyst was then charged to a tubular reactor. The amount charged was 107.5 grams. One hundred eighty grams of ethylene was then passed through this bed of catalyst at 250° F. and 450 p.s.i.g. The total time for the run was four hours, and the calculated space velocity was 360 gas volumes per catalyst volume per hour. The ethylene conversion was 40 percent, and the product comprised 3 mol percent butenes (11 percent 1-butene and 89 percent 2-butene) and 97 mol percent of solid polyethylene.

The melt index of this polymer was 0.34. Melt index was determined by the method of ASTM D1238–57T, except that five cuts were taken and an average was determined (Procedure F).

The crystalline freezing point of this polymer was 251° F. Crystalline freezing point was determined by melting a sample of the polymer, inserting a thermocouple into the molten polymer, and allowing the molten polymer to cool slowly. The temperature versus time curve was plotted, and the crystalline freeze point was taken on the first plateau on this curve.

Example II

A run was carried out in which ethylene was polymized to solid polymer in the presence of a supported $Cr(CO)_6$ catalyst using a stirred reactor technique.

In this run (Run 1), an 87/13 silica/alumina (microspheroidal) was activated with air at 1000° F. for four hours and then flushed briefly with $N_2$ at 400° F. Chromium hexacarbonyl ($Cr(CO)_6$) was subjected to vacuum (35° F. and 100 microns absolute pressure) to remove water and oxygen.

A four-liter reactor equipped with heating, cooling, and stirring means, was heated to 180–220° F. and flushed with nitrogen. The carbonyl compound and support were then separately added to the reactor. The amount of $Cr(CO)_6$ charged was 0.48 gram, and the amount of silica/alumina charged was 10 grams. The nitrogen was flushed from the reactor with cyclohexane vapors and 680 grams of cyclohexane was then charged to the reactor. Ethylene was then charged, and after one hour at 285° F. and 450 p.s.i.g., the reactor was cooled and opened. One hundred twenty-five grams of solid polymer was recovered.

In another run (Run 2), the procedure for Run 1 was repeated except that 0.20 gram of $Cr(CO)_6$ and 2.0 grams of silica-alumina were charged. Twenty-six grams of solid ethylene polymer was recovered.

In Run 3, the procedure for Runs 1 and 2 was used except that the silica-alumina was activated at 1000° F. for 3½ hours and 1500° F. for ½ hour. The amounts of carbonyl and support charged were 0.21 gram $Cr(CO)_6$ and 2.3 grams of silica-alumina. The solid ethylene polymer which was recovered amounted to 16.7 grams.

Run 4 was identical to Run 2 except that 25 cc. of air, measured at atmospheric conditions, was added to the reactor. Only 0.3 gram of solid ethylene polymer was recovered from this run.

Run 5 was carried out in the manner of Run 1, except that 0.49 gram of $Mo(CO)_6$ and 10 grams of silica-alumina were charged. The yield of solid ethylene polymer was 1.4 grams.

Run 6 was carried out by the procedure of Run 1 except that 0.50 gram of $W(CO)_6$ and 10 grams of silica-alumina were charged. A trace of solid ethylene polymer was obtained.

Example III

A run was carried out in which acetylene was polymerized to benzene in the presence of a supported molybdenum hexacarbonyl catalyst.

The catalyst employed in this run was prepared by impregnating activated alumina with a solution of molybdenum hexacarbonyl. The alumina used was pelleted Alcoa alumina gel which was activated by heating in air and then $N_2$ at 1000° F. The carbonyl solution was a solution of molybdenum hexacarbonyl in cyclohexane, and this solution was maintained at 150–160° F. to prevent the carbonyl from precipitating out. Just enough solution was employed to completely wet the support, and the solution concentration (10% by weight $Mo(CO)_6$ was such that the impregnated support contained 97 percent by weight alumina and 3 percent by weight of the molybdenum hexacarbonyl. The cyclohexane was then removed from the catalyst by flushing with $N_2$ for 2 hours at 250–290° F. after which the catalyst was maintained for 2 hours at 250–290° F. under a pressure of approximately 1 mm. Hg absolute pressure.

In this run, 44.5 grams of the above prepared catalyst, and 287 grams of a solution containing 94 percent isobutane and 6 percent by weight acetylene were charged to a one-liter reactor. The reactor was then closed, the stirrer started, and the reactor heated to 100° F. The run was continued for 3 hours, during which time the temperature increased to 260° F., and the pressure increased from an initial value of 120 p.s.i.g. to 475 p.s.i.g.

At the end of the run, the hydrocarbons were flushed out of the reactor into a 1.8 liter bomb maintained at dry ice temperature ($-110°$ F.).

The products were then analyzed by gas chromatography and mass spectroscopy. The conversion obtained in this run was 100 percent, and the recovered product was predominantly benzene.

Example IV

A run was carried out in which ethylene was converted to higher olefins, principally 1-butene, according to one embodiment of this invention.

In this run, pelleted alumina was heated to 1000° F. in air and then nitrogen to activate this support, following which the activated alumina was impregnated with a cyclohexane solution of tungsten hexacarbonyl. Just enough of the solution of tungsten hexacarbonyl was employed to completely wet the support, and the concentration of the solution (approximately 5 wt. percent), maintained at 150–160° F., was employed to provide 2 weight percent on the alumina. The cyclohexane was then removed from the catalyst by flushing with nitrogen for 2 hours at 250–290° F. The composite was then maintained at 250–290° F. for 2 hours under a pressure of 1 mm. mercury absolute pressure.

The above prepared catalyst was then employed for the conversion of ethylene to higher olefins by a fixed catalyst bed technique. In this fixed bed system, 121.8 grams of the above-prepared catalyst was charged to a tubular reactor, and 70 grams of ethylene was passed through the reactor over a 2 hour period. The conditions in the reactor during the run were 250° F. and 460 p.s.i.g. The effluent from the reactor was reduced to atmospheric pressure, a sample of the total effluent was obtained and analyses were then made by gas chromatography and mass spectroscopy.

The conversion in this run was 4 percent and the product contained 21 mol percent proylene, 7.9 mol percent 2-butene and 71.1 mol percent 1-butene.

Example V

In another run, carried out by the procedure of Example IV, 84 grams of the supported $W(CO)_6$ catalyst of Example IV, containing 2 weight percent of tungsten hexacarbonyl was charged to the tubular reactor. Ethylene was passed over the catalyst at 345° F., 450 p.s.i.g. and 500 v./v./hour. The conversion in this run was 2.72 percent. The product contained 33.1 weight percent propylene. 58.8 weight percent 1-butene, 6.98 weight percent 2-butene, 0.73 weight percent cyclopropane and 0.369 weight percent methylcyclopropane.

Example VI

In another run by the method of Example V, 87 grams of the catalyst of Example V were charged to the tubular reactor, and ethylene was passed over the catalyst at 310° F., 450 p.s.i.g. and 50 v./v./hour. The conversion obtained was 3.89 percent, and the products contained 13.61 weight percent propylene, 80.3 weight percent 1-butene, 5.64 weight percent 2-butene, and 0.25 weight percent each of cyclopropane and methlycyclopropane.

Example VII

In a number of runs, catalysts were prepared and tested for the disproportionation of olefins.

The catalysts employed in these runs were prepared by impregnating activated alumina with a cyclohexane solution of Mo(CO)$_6$. The alumina support was a pelleted alumina which was activated by heating in air and then nitrogen at 1000° F. The activated support was then impregnated with a solution of Mo(CO)$_6$ in cyclohexane. The solution employed ranged from about 5 grams of Mo(CO)$_6$ per 100 ml. cyclohexane up to about 10 grams/100 ml., the approximate saturation point at the 150–160° F. temperature used to maintain the carbonyl in solution during the vacuum impregnation. Vacuums of from about 1.0 to 10 mm. Hg absolute pressure were used, and only enough solution was used to completely wet the support. The solution concentration was calculated to provide the desired amount of molybdenum hexacarbonyl on the support. The cyclohexane was then removed from the catalyst by flushing with N$_2$ for 2 hours at 250–290° F., after which the catalyst was maintained under a vacuum of about 1 mm. Hg absolute pressure at 250–290° F. for 2 hours.

The supported carbonyl catalysts were then employed for the disproportion of olefins in a fixed bed reactor. In this system, liquid olefins were degassed by heating to their boiling point, and charged at the desired rate through a drying tube and into a tubular reactor by means of a proportioning pump. Approximately 100 ml. of catalyst was charged to the reactor in each run.

The effluent from the reactor was reduced to atmospheric pressure, and the gaseous fraction was separated from the liquid fraction in a fractionation column. The weight of each fraction was measured, and a representative sample of the composite of each fraction was obtained.

The products were analyzed by gas chromatography and mass spectroscopy. The results of these runs are expressed below as Table I.

supported molybdenum hexacarbonyl catalyst of this invention are active for converting:

(a) Propylene mainly to 2-butene and ethylene (Run 1);

(b) Normal butenes to mainly 2-pentene, hexenes, propylene and ethylene (Runs 2, 3, 4 and 5);

(c) 1-pentene mainly to hexenes and butenes;

(d) 1-hexene mainly to heptenes, pentenes, butenes and propylene (Run 7).

It can also be seen that the supported Mo(CO)$_6$ catalyst is active for double-bond isomerization. The following tabulation summarizes the isomerization data for the runs in Table I.

TABLE I

| Feed | Temperature, °F. | Percent isomerization | Product |
|---|---|---|---|
| 1-butene | 250 | 19 | 2-butene. |
| Do | 450 | 65 | Do. |
| 2-butene | 450 | 5 | 1-butene. |
| 1-pentene | 250 | 15 | 2-pentene. |
| 1-hexene | 250 | 15 | 2-, 3-hexenes. |

It can be further seen from Table I that higher temperatures favor double-bond isomerization.

Example VIII

In another series of runs, the supported Mo(CO)$_6$ catalysts were used in stirred reactor tests.

In these tests, the catalysts were prepared as described in Example VII except that in most of the runs, the pelleted alumina was crushed to 10–100 mesh prior to impregnation with carbonyl solution. In the remainder of the runs, a pelleted catalyst was employed.

In each stirred reactor test, about 50 ml. of the catalyst and 230–330 grams of olefin were charged to a one-liter reactor. The interval stirrer was started and the reactor

TABLE I

| Run No. | 1 | 2 | 3 | 4 | 5 | 6 | 7 | 8 |
|---|---|---|---|---|---|---|---|---|
| Feed: | | | | | | | | |
| Olefin | Propylene | 1-butene | 1-butene | 2-butene | 2-butene | 1-pentene | 1-hexene | Cyclohexene |
| Isobutane diluent, wt. percent | 0 | 0 | 0 | 0 | 0 | 0 | 68 | 69 |
| Catalyst: | | | | | | | | |
| Wt. percent Mo(Co)$_6$ on support [1] | 3.0 | 1.3 | 2.0 | 3.0 | 1.6 | 2.0 | 2.0 | 2.0 |
| Grams in bed | 118.7 | 103.7 | 114.9 | 103.7 | 95.3 | 96.2 | 115.3 | 115.3 |
| Operating conditions: | | | | | | | | |
| Temp., °F | 250 | 250 | 450 | 450 | 450 | 250 | 250 | 250 |
| Pressure, p.s.i.g | 500 | 500 | 500 | 500 | 500 | 500 | 500 | 500 |
| Vol./vol./hour [2] | 300 | 1.5 | 1.9 | 1.6 | 1.6 | 1.6 | 1.6 | 1.7 |
| Run length, hours | 5 | 5 | 5 | 5 | 5 | 5 | 5 | 5 |
| Conversion, percent [3] | 25 | 10 | 18 | 15 | 16 | 60 | 54 | 0 |
| Isomerization, percent [4] | 0 | 19 | 65 | 66 | 5 | 15 | 15 | |
| Product distribution, mol percent: | | | | | | | | |
| Ethylene | 42 | 8 | 5 | 7 | 5 | 2 | 5 | |
| Propylene | Feed | 34 | 39 | 33 | 36 | 21 | 13 | |
| Butenes | 55 | Feed | Feed | Feed | Feed | 27 | 12 | |
| Pentenes | 2 | 18 | 40 | 38 | 39 | Feed | 15 | |
| Hexenes | | [5] 32 | 12 | 14 | 10 | 27 | Feed | |
| Heptenes | | | 2 | 4 | | 10 | 10 | |
| Octenes | 1 | 8 | 1 | 2 | 10 | 11 | 55 | |
| Nonenes | | | 1 | 1 | | 1 | | |
| Heavier | | | | 1 | | 1 | | |
| Butene distribution, mol percent: | | | | | | | | |
| 1-butene | | | | | | | 33 | |
| 2-butene | | 100 | | | | | 67 | |
| Pentene distribution, mol percent: | | | | | | | | |
| 1-pentene | | 2 | 5 | 4 | 6 | | 52 | |
| 2-pentene | | 98 | 88 | 80 | 75 | | 40 | |
| Isopentene | | | 7 | 16 | 19 | | 8 | |

[1] Amount added to activated alumina by impregnation.
[2] Volume liquid/volume catalyst per hour except Run 1, which is volume gas/ vol. catalyst/hour.
[3] Excludes the isomerization of double bonds in feed, e.g. 1-butene to 2-butene.
[4] Percent of double bond isomerization of feed.
[5] Predominantly trans-3-hexene.

In Table I, Runs 1 through 7 represent runs within the scope of the invention, while Run 8 is a control run in which a cyclic olefin was used. It can be seen that no conversion was obtained in Run 8. The runs show that the was heated to the desired temperature. After 2 to 3 hours at the operation temperature, the hydrocarbons were removed by flashing from the hot reactor into a 1.8 liter bomb at Dry Ice temperature. The products were then analyzed as described in Example VII. The results of these runs are expressed below as Table II.

In Table III, Runs 17 through 20 are invention runs demonstrating that different techniques of catalyst prep-

TABLE II

| Run No. | 9 | 10 | 11 | 12 | 13 | 14 | 16 |
|---|---|---|---|---|---|---|---|
| Feed: | | | | | | | |
| Olefin | 1-butene | 2-butene | Isobutene | 2-pentene | Cis-2-pentene | 2-hexene | 1-octene |
| Grams Olefin | 250 | 250 | 230 | 230 | 330 | 250 | 230 |
| Catalyst: | | | | | | | |
| Mo(CO)$_6$ wt. percent [1] | 3.0 | 3.0 | 3.0 | 3.0 | 3.0 | 3.0 | 3.0 |
| Grams | 41.0 | 39.2 | 45.9 | 43.1 | 45.8 | 45.5 | 44.6 |
| Operating conditions: | | | | | | | |
| Temperature, °F | 250 | 250 | 250 | 250 | 250 | 250 | 250 |
| Pressure, p.s.i.g | 420 | 360 | 220 | 145 | 160 | 50 | 50 |
| Run length, hours | 2 | 2 | 3 | 3 | 3 | 3 | 3 |
| Conversion, percent [2] | 7.4 | 2.3 | 96 | 51 | 46 | 7 | 41 |
| Isomerization, percent | 9.3 | 1.7 | | 1 | 2 | | |
| Product distribution, mol percent: | | | | | | | |
| Ethylene | 40 | | | | | | 13 |
| Propylene | 19 | 58 | | 8 | 7 | | |
| Butenes | Feed | Feed | Feed | 58 | 42 | 3 | |
| Pentenes | 11 | 42 | | Feed | Feed | 26 | 1 |
| Hexenes | | | | | | Feed | |
| Heptenes | | | | | | 22 | 10 |
| Octenes | 30 | | 50 | 34 | 51 | 7 | Feed |
| Nonenes | | | | | | 3 | 39 |
| Heavier | | | 50 | | | 39 | 37 |
| Butene distribution, percent: | | | | | | | |
| 1-butene | | | | 12 | 8 | | |
| 2-butene | | | | 88 | 92 | | |
| Pentene distribution, percent: | | | | | | | |
| 1-pentene | | | | | | | |
| 2-pentene | 100 | 100 | | | | 100 | |

[1] Wt. percent Mo(CO)$_6$ in catalyst during preparation.  [2] Excluding isomerization of double bonds in olefin feedstock.

In Table II, Run 11 is a control run, while the other runs fall within the scope of this invention. It can be seen that polymerization of isobutene was effected in Run 11.

Example IX

In another series of runs, Mo(CO)$_6$ was supported on various supports and tested for activity in the disproportionation of olefins.

Several of the catalysts were prepared by the impregnation-vacuum method of Example VII, while one catalyst was prepared by vacuum impregnation followed by heat treatment under nitrogen. In two other runs, the activated catalyst support was dry mixed with the Mo(CO)$_6$, after which the composite was heat treated at an elevated temperature. One run was tried in which no support was employed.

In all but two of the runs, 1-butene was the olefin charged. In the other two runs, Runs 21 and 22, the feed was 2-butene. Some of the runs were made using the fixed bed technique of Example VII, while others were made using the stirred reactor technique of Example VIII. The results of these runs are expressed below as Table III.

aration can be employed. Run 21 is a control run showing that 1000° F. is too high a temperature for catalyst treatment. Runs 22 and 23 demonstrate that silica-alumina and silica are satisfactory supports, while Runs 24 and 25 demonstrate that charcoal supported catalysts and unsupported catalysts are unsatisfactory.

Other supports which were tried and found to be ineffective were pumice, zinc oxide, zirconium oxide, titanium oxide, cobalt-thoria and brucite.

Example X

Two runs were made in which a supported W(CO)$_6$ catalyst was employed for the disproportionation of olefins.

The catalysts were prepared by the impregnation technique of Example VII, using activated alumina as the support. The impregnated supports were vacuum treated at 280° F. The disproportionation runs were carried out by the fixed bed technique of Example VII. One run was made without a diluent, while the other run employed

TABLE III

| Run No. | 17 | 18 | 19 | 20 | 21 | 22 | 23 | 24 | 25 |
|---|---|---|---|---|---|---|---|---|---|
| Feed | 1-butene | 1-butene | 1-butene | 1-butene | 2-butene | 2-butene | 1-butene | 1-butene | 1-butene |
| Mo(CO)$_6$, wt. percent | 1.3 | 3 | 6 | 3 | 1.3 | 3 | 6 | 4 | 100 |
| Support | Alumina | Alumina | Alumina | Alumina | Alumina | Silica-Alumina | Silica | Charcoal | None |
| Treatment [1] | Imp-Vac | Imp-Vac | DM | Imp-Vac | Imp-N$_2$ | Imp-Vac | DM | Imp-Vac | |
| Treatment temp., °F | 280 | 280 | 310 | 500 | 1,000 | 280 | 310 | 280 | None |
| Grams used | 103.7 | 46.5 | 47.5 | 41.7 | Not Meas. | Not Meas. | 31.6 | | 16.9 |
| Operating conditions: | | | | | | | | | |
| Type reactor [2] | Fixed bed | Stirred | Stirred | Stirred | Fixed bed | Fixed bed | Stirred | Fixed bed | Stirred |
| Temperature, °F | 250 | 250 | 250 | 250 | 250 | 250 | 250 | 250 | 250 |
| Pressure, p.s.i.g | 500 | 385 | 400 | 375 | 500 | 500 | 375 | 500 | 380 |
| Run length, hours | 5 | 4 | 3 | 3 | 3 | 5 | 2 | 5 | 2 |
| Conversion, percent | 10 | 3 | 15 | 6 | 0 | 57 | 13 | 1 | 0 |
| Isomerization, percent | 19 | 19 | 10 | 19 | | | 75 | 12 | 3 |
| Product distribution, mol percent: | | | | | | | | | |
| Ethylene | 8 | 8 | 30 | 17 | | | 38 | 28 | |
| Propylene | 34 | 47 | 17 | 17 | | 10 | | | |
| Butenes | Feed | Feed | Feed | Feed | | Feed | Feed | Feed | |
| Pentenes | 18 | 19 | 14 | 15 | | 5 | 37 | 24 | |
| Hexenes | 32 | 23 | 39 | 51 | | | 25 | 16 | |
| Heavier | 8 | 3 | | | | 85 | | 32 | |

[1] Imp-Vac indicates impregnation as described in Example I followed by vacuum treatment at indicated temperature. Imp-N$_2$ indicates impregnation as described in Example I followed by N$_2$ treatment at indicated temperature. DM indicates dry mixing of Mo(CO)$_6$ with support followed by heating to indicated temperatures.
[2] Fixed bed technique identical to Example I.  Stirred bed technique identical to Example II.

isobutane as the diluent. The results of these runs are expressed below as Table IV.

TABLE IV

| Run No. | 26 | 27 |
|---|---|---|
| Catalyst: | | |
| Carbonyl | W(CO)₆ | W(CO)₆ |
| Weight percent | 2.0 | 2.0 |
| Support | Alumina | Alumina |
| Grams | 108.8 | 104.8 |
| Feed: | | |
| Olefin | 1-butene | 1-pentene |
| Isobutane diluent, wt. percent | 0 | 66 |
| Grams olefin + diluent | 690 | 440 |
| Operating Conditions: | | |
| Temperature, °F | 250 | 250 |
| Pressure, p.s.i.g | 510 | 500 |
| Run length, hours | 5 | 3 |
| Conversion, percent [1] | 7 | 44 |
| Isomerization, percent | 8 | 20 |
| Product distribution, mol percent: | | |
| Ethylene | | |
| Propylene | 28 | 34 |
| Butenes | Feed | 18 |
| Pentenes | 28 | Feed |
| Hexenes | 40 | 13 |
| Heptenes | 1 | 10 |
| Octenes | 3 | 24 |
| Heavier | | 1 |
| Butene distribution, percent: | | |
| 1-butene | | 3 |
| 2-butene | | 97 |
| Pentene distribution, percent: | | |
| 1-pentene | 2 | |
| 2-pentene | 92 | |
| Isopentene | 6 | |
| Isomerization product | 2-butene | 2-pentene |

[1] Excluding isomerization of feed.

Example XI

A run was carried out in which ethylene was converted to a mixture of hydrocarbons, including cyclopropane and methylcyclopropane.

In this run, pelleted alumina catalyst was heated to 1100° F. in air and then nitrogen to activate this support, following which the activated alumina was impregnated with a cyclohexane solution of molybdenum hexacarbonyl. Just enough of the solution was employed to completely wet the support, and the concentration of the solution was adjusted to provide the desired amount of carbonyl compound on the support as shown in the following table. The cyclohexane was then removed from the catalyst by flushing with nitrogen for 2 hours at 250–290° F. The composite was then maintained at 250–290° F. for 2 hours under a pressure of 1 mm. mercury absolute pressure.

The above prepared catalyst was then contacted with ethylene in a fixed catalyst bed run. In this fixed bed system, 100 ml. of the catalyst was charged to a tubular reactor, and gaseous ethylene was passed through the reactor at the desired rate. The reactor, in each run, was heated to the desired temperature. The effluent from the reactor was reduced to atmospheric pressure and the products were then analyzed by gas chromatography and mass spectroscopy. The results of these runs are expressed below as Table V.

Run 3 in the table is a control run showing that 150° F. is not satisfactory for the process of this invention. Run 7 is also a control run showing that atmospheric pressure is not satisfactory when it is desired to obtain cyclopropane and methylcyclopropane. It can also be seen that the conversion is extremely low in this run. Run 9 shows the results obtained when a higher percentage of molybdenum carbonyl is employed in the composite catalyst.

Example XII

A run was carried out in which ethylene was polymerized to solid polymer by contacting with a molybdenum hexacarbonyl-alumina catalyst using a stirred reactor technique. The polymerization was carried out in the presence of benzene, although other aromatic hydrocarbons including toluene, xylenes, and the like can also be used.

A 246 gram quantity of 10–100 mesh alumina (which had previously been preactivated at 1000° F. in air for 5 hours and in nitrogen for 2 hours) was dispersed in a 155 cc. cyclohexane solution containing 7.8 grams of molybdenum hexacarbonyl at 140–50° F. The cyclohexane solvent was then removed from the slurry by heating at 280° F. for 2 hours in the presence of nitrogen followed by an additional 2 hours at that temperature under reduced pressure.

A 45.9 grams portion of this above prepared catalyst was charged into a 1-liter, stirred reactor, followed by 182 grams benzene. The reactor system was heated to 250° F. and then pressured to 480 p.s.i.g. with the addition of about 33 grams of ethylene. After 2 hours the reactor was cooled to 80° F. and 0.9 gram of solid polymer was recovered from the system.

A similar experiment which was substantially identical to the above described procedure, except that cyclohexane was used as the reaction solvent instead of benzene, was carried out as a control. No appreciable solid polymer was observed in this control run.

It will be evident to those skilled in the art that many variations and modifications can be practiced from a consideration of the foregoing disclosure. Such variations and modifications are believed to be within the spirit and scope of the present invention.

I claim:

1. A catalyst composition comprising a Group VI–A metal hexacarbonyl selected from the group consisting of molybdenum hexacarbonyl and tungsten hexacarbonyl and a material selected from the group consisting of silica, alumina and silica-alumina.

2. A catalyst composition according to claim 1 wherein the amount of said carbonyl ranges from 0.01 to 20 weight percent based on said material.

3. A supported Group VI–A metal hexacarbonyl catalyst, said support being selected from the group consisting of silica, alumina and silica-alumina and wherein the support has been activated by heating with an oxygen-

TABLE V

| Run No. | 1 | 2 | 3 | 4 | 5 | 6 | 7 | 8 | 9 |
|---|---|---|---|---|---|---|---|---|---|
| Catalyst, wt. percent Mo(CO)₆ | 2 | 2 | 2 | 2 | 2 | 2 | 3 | 3 | 5 |
| Conditions: | | | | | | | | | |
| Temp. °F | 280 | 450 | 150 | 250 | 250 | 290 | 250 | 250 | 250 |
| P.s.i.g | 500 | 450 | 450 | 470 | 460 | 460 | 0 | 920 | 480 |
| V./v./hr.[1] | 250 | 140 | 250 | 330 | 140 | 110 | 270 | 300 | 200 |
| Run length, hrs | 4 | 4 | 4 | 2 | 4 | 2 | 3 | 3 | 2 |
| Conversion, percent [2] | 2.7 | 3.0 | 0.0 | 0.6 | 3.2 | 5.0 | 0.3 | 2.0 | 1.3 |
| Product distribution, wt. percent: | | | | | | | | | |
| Propylene | 28 | 62 | | 57 | 58 | 64 | 67 | 52 | 54 |
| 1-butene | 26 | 6 | | 9 | 27 | 8 | 33 | 26 | 31 |
| 2-butene | 26 | 25 | | 29 | 8 | 18 | | 8 | 15 |
| 2-pentene | | 4 | | | | | | | |
| Neopentane | | 1 | | | | | | | |
| Cyclopropane | 8 | | | 5 | 3 | 8 | | 6 | Trace |
| Methylcyclopropane | 12 | | | | 4 | 2 | | 4 | Trace |
| n-Butane | | 2 | | | | | | | |
| 1-pentene | | | | | | | | 4 | |

[1] Gas volumes per volume of catalyst per hour.   [2] Excluding a very small amount of solid ethylene polymer which was formed.

containing medium at a temperature above about 500° F.

4. A process for converting acyclic mono-unsaturated alkene hydrocarbon reactants selected from the group consisting of 1-alkenes and 2-alkenes principally to higher molecular weight products which comprises contacting at least one of said reactants at reaction conditions within the range of 0 to 600° F. wherein the desired conversion is obtained with a catalyst comprising a Group VI–A metal hexacarbonyl associated with a material selected from the group consisting of silica, alumina, and silica-alumina.

5. A process according to claim 4 wherein said contacting is carried out in the presence of a liquid hydrocarbon diluent and the amount of catalyst employed ranges from 0.5 to about 40 weight percent of the reaction mixture.

6. A process for converting an acylic mono-unsaturated hydrocarbon reactant selected from the group consisting of 1-alkenes and 2-alkenes having from 2 to 16 carbon atoms, inclusive, principally to higher molecular products which comprises contacting said reactant at a temperature in the range 0° F. to 600° F. with a catalyst comprising a Group VI–A metal hexacarbonyl associated with a material selected from the group consisting of silica, alumina, and silica-alumina.

7. A process according to claim 6 wherein said reactant is ethylene, said carbonyl is chromium hexacarbonyl, said contacting is at a temperature in the range 150–450° F., and said product is a solid polymer of ethylene.

8. A process according to claim 6 wherein said reactant is ethylene, said carbonyl is tungsten hexacarbonyl, said contacting is at a temperature in the range 100–400° F., and said product contains a major proportion of 1-butene.

9. A process according to claim 6 wherein said reactant is ethylene, said carbonyl is molybdenum hexacarbonyl, said contacting is at a temperature in the range 200–400° F., and said product contains minor proportion of cyclopropanes.

10. A process according to claim 6 wherein the contacting is carried out in the presence of a liquid hydrocarbon diluent and said catalyst employed is in the range 0.5 to about 40 weight percent of the reaction mixture.

11. A process according to claim 10 wherein said reactant is ethylene, said carbonyl is molybdenum hexacarbonyl, said contacting is at a temperature in the range 150–450° F. and in the presence of an aromatic hydrocarbon diluent, and said product is a solid polymer of ethylene.

12. A process for the disproportionation of 1-alkene and 2-alkene reactants having from 3 to 16 carbon atoms, inclusive, which comprises contacting at least one of said reactants at a temperature in the range 100 to 500° F. with a catalyst consisting essentially of a material selected from the group consisting of molybdenum hexacarbonyl and tungsten hexacarbonyl associated with a material selected from the group consisting of silica, alumina and silica-alumina to produce olefins of both lower and higher molecular weight than the starting reactant.

13. A process according to claim 12 wherein the contacting is carried out in the presence of a liquid hydrocarbon diluent and said catalyst employed is in the range 0.5 to about 40 weight percent of the reaction mixture.

14. As a new composition of matter catalytically active for the selective polymerization of tertiary olefinic hydrocarbons, molybdenum hexacarbonyl supported on calcined silica gel.

15. As a new composition of matter catalytically active for the selective polymerization of tertiary olefinic hydrocarbons, tungsten hexacarbonyl supported on calcined silica gel.

16. As a new composition of matter catalytically active for the conversion of olefinic hydrocarbon, molybdenum hexacarbonyl supported on a material selected from the group consisting of calcined silica gel, alumina or silica-alumina.

17. As a new composition of matter catalytically active for the conversion of olefinic hydrocarbons, tungsten hexacarbonyl supported on a material selected from the group consisting of calcined silica gel, alumina or silica alumina.

18. Process for the polymerization of a hydrocarbon having 1 olefinic bond which comprises contacting said hydrocarbon with a catalytically active amount of a Group VIb metal hexacarbonyl selected from the group consisting of molybdenum hexacarbonyl and tungsten hexacarbonyl at a temperature within the range of from 75 to 316° C. to polymerize said hydrocarbon.

19. Process in accordance with claim 18 wherein said hydrocarbon is a tertiary olefin having from 4 to 10 carbon atoms.

20. Process in accordance with claim 18 wherein said metal hexacarbonyl is molybdenum hexacarbonyl.

21. Process in accordance with claim 18 wherein said metal hexacarbonyl is tungsten hexacarbonyl.

22. Process in accordance with claim 18 wherein said hydrocarbon comprises isobutylene.

23. Process in accordance with claim 18 wherein the metal hexacarbonyl is present in the form of a supported catalytically active mass.

24. Process in accordance with claim 18 wherein the catalyst is present in an amount of at least 0.5 weight percent.

25. A process according to claim 12 wherein the contacting is carried out in the presence of a liquid hydrocarbon diluent and the catalyst comprises from 0.01 to about 20 weight percent of the metal carbonyl based on the support.

References Cited

UNITED STATES PATENTS

| | | | |
|---|---|---|---|
| 2,965,626 | 12/1960 | Pilar et al. | 260—94.9 |
| 3,083,246 | 3/1963 | Holzman et al. | 260—683.15 |
| 3,129,243 | 4/1964 | Hubel | 260—673 |

DELBERT E. GANTZ, Primary Examiner

C. E. SPRESSER, Assistant Examiner

U.S. Cl. X.R.

252—430, 431; 260—94.9, 673, 683, 683.2, 683.15